United States Patent
Regnier et al.

[15] 3,705,899
[45] Dec. 12, 1972

[54] BENZAMIDOETHYL PIPERAZINES

[72] Inventors: Gilbert Regnier, Chatenay Malabry; Roger Canevari, Clamart; Jacques Duhault, Chatou, all of France

[73] Assignee: Societe en nom collectif "SCIENCE UNION ET Cie"

[22] Filed: May 11, 1970

[21] Appl. No.: 36,486

[30] Foreign Application Priority Data

May 23, 1969  Great Britain..........26,437/69

[52] U.S. Cl. .260/256.4 N, 260/256.5 R, 260/268 H, 260/268 BZ, 260/268 R, 424/200, 424/250, 424/251
[51] Int. Cl. ..............................................C07d 57/24
[58] Field of Search....................260/268 H, 256.4 N

[56] References Cited

UNITED STATES PATENTS

| | | |
|---|---|---|
| 2,958,694 | 11/1960 | Janssen...................260/268 H |
| 2,985,657 | 5/1961 | Janssen...................260/268 H |
| 3,331,843 | 7/1967 | Tomcufcik et al..260/256.4 N |
| 3,435,036 | 3/1969 | Regnier et al..........260/268 H |

*Primary Examiner*—Alex Mazel
*Assistant Examiner*—R. J. Gallagher
*Attorney*—Gordon W. Hueschen

[57] ABSTRACT

Benzamidoethyl piperazines of the formula:

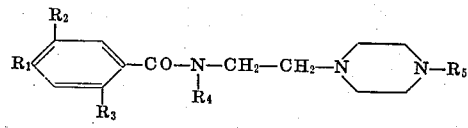

wherein $R_1$ is lower alkoxy, amino or acylamino; $R_2$ is hydrogen, halogen, lower alkyl or amino, or $R_1 + R_2$ are methylenedioxy; $R_3$ is hydrogen, halogen, lower alkoxy, hydroxy or amino; $R_4$ is hydrogen, lower alkyl or lower alkenyl; $R_5$ is

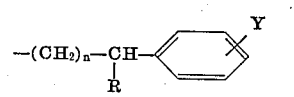

wherein n is 0, 1, 2 or 3, R is hydrogen, phenyl or halo-phenyl and Y is hydrogen, halogen, lower alkoxy or methylenedioxy, and $R_5$ is also pyrimidyl, pyrazinyl, and optionally substituted 2-pyridyl, 4-pyridyl, 2-pyridyl N-oxide and 4-pyridyl N-oxide.

These compounds possess broncholytic, antianaphylactic and gastric anti-secretory properties.

7 Claims, No Drawings

BENZAMIDOETHYL PIPERAZINES

The present invention provides benzamidoethyl piperazines of the general formula I

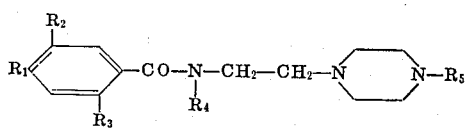

wherein
$R_1$ is selected from the group consisting of a lower alkoxy radical containing one to four carbon atoms inclusive, an amino radical and an acylamino radical in which the acyl group contains up to 4 carbon atoms inclusive;
$R_2$ is selected from the group consisting of a hydrogen atom, a halogen atom selected from chlorine and fluorine atoms, a lower alkyl radical containing 1 to four carbon atoms inclusive and an amino radical; or $R_1$ and $R_2$ together represent a methylenedioxy radical;
$R_3$ is selected from the group consisting of a hydrogen atom, a halogen atom selected from chlorine and fluorine atoms, a lower alkoxy radical containing 1 to 4 carbon atoms inclusive; a hydroxy and an amino radical;
$R_4$ is selected from the group consisting of a hydrogen atom, a lower alkyl radical containing one to four carbon atoms inclusive and a lower alkenyl radical containing two to four carbon atoms inclusive;
$R_5$ is selected from the group consisting of
a. a radical

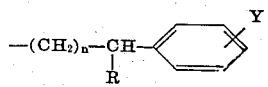

in which means selected from 0, 1, 2 and 3; R is selected from the group consisting of a hydrogen atom, a phenyl and a halophenyl radical, and Y is selected from the group consisting of a hydrogen atom, a halogen atom, selected from chlorine and fluorine atoms, a lower alkoxy radical containing one to four carbon atoms inclusive and a methylenedioxy radical;
b. a pyrimidyl and a pyrazinyl radical;
c. a 2-pyridyl radical and a 4-pyridyl radical of the general formula

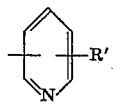

in which R' is selected from the group consisting of a hydrogen atom, a lower alkyl radical and a lower alkoxy radical each containing one to four carbon atoms inclusive, it being possible for this radical to exist in the form of a N-oxide of the formula:

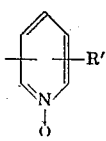

in which R' has the meanings given above.

The compounds of the present invention are new and are prepared by a method which is in itself known and which comprises condensing a benzoic acid compound such as an acid chloride or a mixed anhydride of the general formula II:

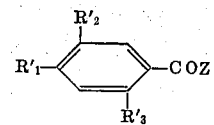

in which
Z is selected from the group consisting of a chlorine atom and a $-O-COC_2H_5$ radical;
$R'_1$ is selected from the group consisting of a lower alkoxy radical containing one to four carbon atoms inclusive, a nitro radical and an acylamino radical in which the acyl group contains up to four carbon atoms inclusive;
$R'_2$ is selected from the group consisting of a hydrogen atom, a halogen atom, a lower alkyl radical containing one to four carbon atoms inclusive and a nitro radical, or $R'_1$ and $R'_2$ together represent a methylenedioxy radical;
$R'_3$ is selected from the group consisting of a hydrogen atom, a halogen atom, a lower alkoxy radical containing one to four carbon atoms inclusive, a hydroxy radical and a nitro radical,
with a disubstituted piperazine of the general formula III:

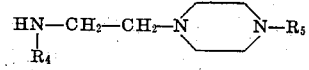

in which $R_4$ and $R_5$ have the meanings given above, and in the case where $R'_1$ or $R'_2$ or $R'_3 = NO_2$, the nitro compound obtained is reduced with hydrogen in the presence of a catalyst to form the corresponding amino compound.

One of the most satisfactory way of carrying out this process comprises reacting an acid chloride of general formula II, in which Z represents a chlorine atom, with a piperazine of the general formula III in essentially equimolecular proportions in solution in a solvent, for example, ethers such as tetrahydrofurane, or hydrocarbons of low boiling point such as benzene, toluene or xylene, at a temperature within the range of from 70° to 140° C, in the presence of an acceptor for the hydrochloric acid formed, it being possible for this acceptor to be a tertiary amine, for example, triethylamine, dimethyl-aniline or pyridine. Generally, the condensation product precipitates and can be isolated by filtration or extraction in an acid medium.

In the case where, in the derivative of general formula II, Z represents a radical $O-COC_2H_5$, prepared "in situ" starting from the corresponding benzoic acid and ethyl chloroformate, it is preferable to carry out the process at a low temperature (about $-5°C$) in dimethylformamide in the presence of an excess of the piperazine III. The amide formed during the reaction crystallizes from the medium and can easily be isolated by filtration or by extraction with a mineral acid.

In the case where $R'_1$ or $R'_2$ or $R'_3$ in the benzoic acid derivative II employed represent a nitro radical, the nitro derivative obtained is reduced in a polar solvent such, for example, as an aliphatic alcohol miscible with water, at ordinary temperature, under a pressure within the range of from 3 to 7 atmospheres and in the presence of platinum as the catalyst.

The derivatives of the present invention are weak bases which can yield addition salts with inorganic or organic strong acids. Among the acids used to form these salts there may be mentioned, in the mineral series, hydrochloric, hydrobromic, sulphuric, phosphoric acids etc... and in the organic series, acetic, propionic, maleic, fumaric, tartaric, citric, oxalic, benzoic, methane-sulphonic acids etc... . These salts are included in the present invention.

The following Examples illustrate the invention. The melting points were determined on the Kofler bench unless otherwise indicated.

EXAMPLE 1

1-(4-ethoxy-benzamidoethyl)-4-(2-pyridyl)-piperazine

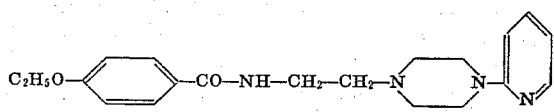

A mixture of 15 g of 4-ethoxybenzoyl chloride and 16.75 g of 1-amino-ethyl-4-(2-pyridyl)-piperazine in 500 ml of xylene was heated under reflux for three hours. When the reaction had ended the mixture was cooled and 28.5 g of 1-(4-ethoxy-benzamidoethyl)-4-(2-pyridyl)-piperazine monohydrochloride, melting at 194° C, were suction-filtered off; this material was treated with 350 ml of 2 N sodium hydroxide solution at 60° C, in the presence of 250 ml of chloroform which dissolved the base at the rate at which it was liberated. The chloroform was washed with water and the solvent was evaporated; 23.5 g of crystals were obtained and these were recrystallized from 140 ml of ethanol. Finally, 22 g of 1-(4-ethoxy-benzamidoethyl)-4(2-pyridyl) piperazine, M.P. 150° C, were obtained.

The 1-aminoethyl-4-(2-pyridyl)-piperazine, B.P./0,5 mm Hg : 140°–145° C, was prepared by reaction of ethyleneimine with 1-(2-pyridyl)-piperazine hydrochloride in ethanol at the boil.

EXAMPLES 2 – 4

The following derivatives were prepared according to the process described in Example 1:
2. 1-(4-ethoxy-benzamidoethyl)-4-piperonyl-piperazine dihydrochloride monohydrate, M.P. (capillary) 249°– 251° C (ethanol), from 4-ethoxy-benzoyl chloride and 1-amino-ethyl-4-piperonyl-piperazine, B.P./0.5 mm Hg: 160°–165° C.
3. 1-(4-ethoxy-benzamidoethyl)-4-(bis-para-fluorobenzhydryl)-piperazine, M.P. (capillary): 150° C (anhydrous ethanol), from 4-ethoxy-benzoyl chloride and 1-aminoethyl-4-(bis-para-fluorobenzhydryl)-piperazine, B.P./0.6 mm Hg : 185°–186° C.
4. 1-(3,4-methylenedioxy-benzamidoethyl)-4-(2-pyridyl)-piperazine, M.P. (capillary) 162°– 164° C (ethanol), from 3,4-methylenedioxy-benzoyl chloride and 1-aminoethyl-4-(2-pyridyl)-piperazine.

EXAMPLE 5

1-(4-amino-benzamidoethyl)-4-(2-pyridyl)-piperazine

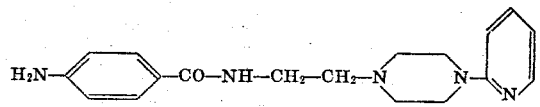

22.5 g of 1-(4-nitro-benzamidoethyl)-4-(2-pyridyl) piperazine, melting at 197° C are obtained, according to the process described in Example 1, carried out starting from 12.7 g of 4-nitrobenzoyl chloride and 14 g of 1-aminoethyl-4-(2-pyridyl)-piperazine in 500 ml of anhydrous xylene.

20 g of this compound were dissolved in 750 ml of ethanol and the resulting solution was hydrogenated at ordinary temperature in the presence of 1 g of platinum oxide under a pressure of within the range of from 3 to 6 atmospheres. When the theoretical amount of hydrogen had been absorbed, the catalyst was filtered off and ¼ ¼ of the solvent were evaporated. 16 g of pinkish-white crystals of 1-(4-amino-benzamidoethyl)-4-(2-pyridyl)-piperazine, melting at 180°–182° C, were obtained by crystallization. The trimethane sulphonate melts at 216°–218° C (ethanol).

EXAMPLES 6 – 23

The following derivatives were prepared according to the process described in Example 5:
6. 1-(4-amino-benzamidoethyl)-4 piperonyl-piperazine trihydrochloride monohydrate, M.P. (capillary): 212°– 215° C (anhydrous ethanol), from 1-(4-nitro-benzamidoethyl)-4-piperonyl-piperazine, M.P. 138° C, itself prepared from 4-nitrobenzoyl chloride and 1-aminoethyl-4-piperonyl-piperazine.
7. 1-(4-amino-benzamidoethyl)-4-(2-pyrimidyl)-piperazine, M.P. capillary: 209° – 211° C (methanol), from 1-(4-nitro-benzamidoethyl)-4-(2-pyrimidyl)-piperazine, M.P. 222° – 224°C, itself prepared from 4-nitrobenzoyl chloride and 1-aminoethyl-4-(2-pyrimidyl)-piperazine, B.P./0,4 mm Hg : 142° – 144° C.
8. 1-(4-amino-benzamidoethyl)-4-(3,3-diphenyl-propyl)-piperazine trihydrochloride dihydrate, M.P. (capillary) : 180° – 195° C (ethanol), from 1-(4-nitro-benzamidoethyl)-4-(3,3-diphenylpropyl)-piperazine dihydrochloride, M.P. 225° – 227° C, itself prepared from 4-nitrobenzoyl chloride and 1-aminoethyl-4-(3,3-diphenylpropyl)-piperazine.
9. 1(2-chloro-4-amino-benzamidoethyl)-4-piperonyl-piperazine trihydrochloride, M.P. (capillary) : 237° – 238° C (anhydrous ethanol), from 1-(2-chloro-4-nitro-benzamidoethyl)-4-piperonyl-piperazine dihydrochloride, M.P. 258° –261° C, itself prepared from 2-chloro-4-nitrobenzoyl chloride and 1-aminoethyl-4-piperonyl-piperazine.
10. 1-(4-amino-benzamidoethyl)-4-(2-pyrazinyl)-piperazine, M.P. (capillary): 207° –208° C (isopropanol), from 1-(4-nitro-benzamidoethyl)-4-(2-pyrazinyl)-pi-perazine, M.P. 140° – 141° C, itself prepared from 4-nitrobenzoyl chloride and 1- aminoethyl-4-(2-pyrazinyl)-piperazine, B.P./0.7 mm Hg : 155°– 160° C.

11. 1-(2-chloro-4-amino-benzamidoethyl)-4-(2-pyridyl)-piperazine trihydro-chloride, M.P. (capillary) : 257° C, with decomposition (anhydrous methanol), from 1-(2-chloro-4-nitro-benzamidoethyl)-4-(2-pyridyl)-piperazine, M.P. 156° C, itself prepared from 2-chloro-4-nitrobenzoyl chloride and 1-aminoethyl-4-(2-pyridyl)-piperazine.

12. 1-(4-amino-benzamidoethyl)-4-(bis-para-fluorobenzhydryl)-piperazine, M.P. (capillary) : 125° –129° C (isopropanol), from 1-(4-nitro-benzamidoethyl)-4-(bis-para-fluorobenzyhydryl)-piperazine, which was in the form of a resinous product, itself prepared from 4-nitrobenzoyl chloride and 1-aminoethyl-4-(bis-para-fluorobenzyhydryl)-piperazine.

13. 1-(2-methoxy-4-amino-5-chloro-benzamidoethyl)-4-(2-pyridyl)-piperazine, M.P. 191° C (methanol), from 1-(2-methoxy-4-nitro-5-chloro benzamidoethyl)-4-(2-pyridyl)-piperazine which was in the form of a resinous product, itself prepared from 2-methoxy-4-nitro-5-chlorobenzoyl chloride and 1-aminoethyl-4-(2-pyridyl)-piperazine.

14. 1-(2-fluoro-4-amino-benzamidoethyl)-4-(2-pyridyl)-piperazine, M.P. 150° C (anhydrous methanol) from 1-(2-fluoro-4-nitro-benzamidoethyl)-4-(2-pyridyl)-piperazine, M.P. 143° – 145° C, itself prepared from 2-fluoro-4-nitrobenzoyl chloride and 1-aminoethyl-4-(2-pyridyl)-piperazine.

15. 1-(3-methyl-4-amino-benzamidoethyl)-4-(2-pyridyl)-piperazine, M.P. (capillary) : 134° – 136° C (anhydrous isopropanol), from 1-(3-methyl-4-nitro-benzamidoethyl)-4-(2-pyridyl)-piperazine, M.P. 157° C, itself prepared from 3-methyl-4-nitrobenzoyl chloride and aminoethyl-4-(2-pyridyl)-piperazine 16. 1-(2-amino-benzamidoethyl)-4-(2-pyridyl)-piperazine, M.P. : 172° – 174° C (ethanol), from 1-(2-nitro-benzamidoethyl)-4-(2-pyridyl)-piperazine, M.P. : 129°C, itself prepared from 2-nitrobenzoyl chloride and 1-aminoethyl 4-(2-pyridyl)-piperazine.

17. 1-(3-amino-benzamidoethyl)-4-(2-pyridyl)-piperazine, M.P. (capillary) : 140° C (anhydrous isopropanol), from 1-(3-nitro-benzamidoethyl)-4-(2-pyridyl)- piperazine, M.P. 157° C, itself prepared from 3-nitrobenzoyl chloride and 1-aminoethyl-4-(2-pyridyl)-piperazine.

18. 1-[(4-amino-benzoyl)-N-methylaminoethyl]-4-(2-pyridyl)-piperazine, M.P. (capillary) : 137° –138° C (anhydrous ethanol), from 1-[(4-nitrobenzoyl)-N-methylaminoethyl]-4-(2-pyridyl)-piperazine, M.P. 135° C, itself prepared from 4-nitrobenzoyl chloride and 1-(N-methylaminoethyl)-4-(2-pyridyl)-piperazine, B.P./0,35 mm Hg : 127°– 133° C.

19. 1-(4-amino-benzamidoethyl)-4-(4-pyridyl)-piperazine, M.P. (capillary) : 245° C with decomposition (ethanol at 88 percent), from 1-(4-nitro-benzamidoethyl)-4-(4-pyridyl) piperazine, M.P. 170°– 171° C, itself prepared from 4-nitrobenzoyl chloride and 1-aminoethyl-4-(4-pyridyl)-piperazine, B.P./0,35 mm Hg : 195°– 200° C.

20. 1-(4-amino-benzamidoethyl)-4-(6-methoxy-2-pyridyl)-piperazine, M.P. (capillary) 125° – 128° C (ethanol), from 1-(4-nitro-benzamidoethyl)-4-(6-methoxy-2-pyridyl)-piperazine, M.P. 150° C, itself prepared from 4-nitrobenzoyl chloride and 1-aminoethyl-4-(6-methoxy-2-pyridyl)-piperazine.

21. 1-(4-amino-benzamidoethyl)-4-(4-pyridyl N-oxide)-piperazine dihydrate M.P. (capillary) 180° C with decomposition (ethanol), from 1-(4-nitro-benzamidoethyl)-4-(4-pyridyl N-oxide)-piperazine, M.P. of monohydrate 222° C, with decomposition, itself prepared from 4-nitrobenzoyl chloride and 1-aminoethyl-4-(4-pyridyl N-oxide)-piperazine.

22. 1-(4-amino-benzamidoethyl)-4-(2-pyridyl N-oxide)-piperazine, M.P. (capillary) : 241° –248° C (ethanol at 90 percent) from 1-(4-nitro-benzamidoethyl)-4-(2-pyridyl N-oxide)-piperazine, M.P. 193° C, itself prepared from 4-nitrobenzoyl chloride and 1-(aminoethyl)-4-(2-pyridyl N-oxide)-piperazine.

23. 1-(4-amino-benzamidoethyl)-4-(4,4-bis p-fluorophenyl-1-butyl)-piperazine trihydrochloride crystallized with 1,5 mol of water, M.P. (capillary) : 176° – 178° C, from 1-(4-nitro-benzamidoethyl)-4-(4,4-bis p-fluorophenyl-1-butyl)-piperazine, M.P. : 85° – 87° C with decomposition, itself prepared from 4-nitrobenzoyl chloride and 1-aminoethyl 4-(4,4-bis p-fluorophenyl-1-butyl)-piperazine.

EXAMPLE 24

1-(2-hydroxy-4-amino-benzamidoethyl)-4-(2-pyridyl)-piperazine

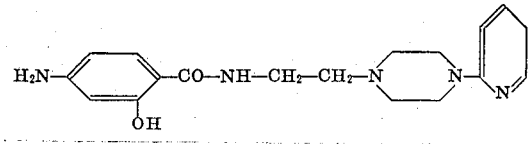

A solution of 21,7 g of ethyl chloroformate in 30 ml of anhydrous dimethylformamide (D.M.F.) was added, at −10° C, to a solution of 18,3 g of 4-nitrosalicyclic acid in 500 ml of anhydrous D.M.F. containing 20,2 g of triethylamine. A very thin suspension was obtained and this was stirred for 2 hours, at −10°C. Then 41,6 g of 1-aminoethyl-4-(2-pyridyl)-piperazine was added to this suspension, for 30 minutes, at a temperature −4° C. The so-obtained precipitate was allowed to stand at room temperature for 20 hours, then it was suctioned off, and the filtrate was evaporated under reduced pressure. The so-obtained oily residue was dissolved in 350 ml of 2N methane sulphonic acid. The slight insoluble phase was filtered off and the filtrate was alkalinized with an excess of potassium carbonate. The base was extracted several times with chloroform and the chloroformic solution was washed with water, dried with potassium carbonate and evaporated under reduced pressure ; 32 g of a crude oily base were obtained. This base was treated with 200 ml of a normal sodium hydroxide solution. The insoluble precipitate was filtered off and the alkaline solution was neutralized to pH 7,3 with 200 ml of a normal hydrochloric acid solution.

Then the aqueous phase was extracted with chloroform. The chloroform was evaporated and 14,5 g of crystals were obtained. This product recrystallized from 290 ml of anhydrous ethanol gave 6,5 g of 1-(2-hydroxy-4-nitro-benzamido-ethyl)-4-(2-pyridyl)-piperazine, M.P. 185° C.

By hydrogenation of this compound according to the process described in Example 5, 4 g of 1-(2-hydroxy-4-amino-benzamidoethyl)-4-(2-pyridyl)-piperazine, M.P. 240° – 245° C with decomposition (methanol), were obtained.

EXAMPLES 25 – 26

The following derivatives were prepared according to the process described in Example 24:

25.  1-(4-acetamido-benzamidoethyl)-4-(2-pyridyl)-piperazine dihydrochloride dihydrate, M.P. (capillary) : 174° – 175° C with decomposition (ethanol), from 4-acetamido benzoic acid, ethyl chloroformate and 1-aminoethyl-4-(2-pyridyl)-piperazine.

26.  1-(2-methoxy-4-acetamido-5-chloro-benzamidoethyl)-4-(2-pyridyl)-piperazine, M.P. 154° C (anhydrous ether), from 2-methoxy-4-acetamido-5-chloro-benzoic acid, M.P. 193° C, ethyl chloroformate, and 1-aminoethyl-4-(2-pyridyl)-piperazine.

The new derivatives of the invention and their physiologically tolerable salts possess valuable pharmacological and therapeutic properties, especially broncholytic, antianaphylactic, and gastric antisecretory properties.

Their toxicity is low and the $LD_{50}$ in mice varies from 100 to >1000 mg/kg by the intraperitoneal route and from 400 to >1200 mg/kg by the oral route.

The broncho-dilatory activity was studied in the guinea-pig by the method of H. KONZETT and R. ROSSLER (Arch. Exp. Path. u. Pharm. 195, 71 (1940)). The new compounds, injected by the intravenous route at doses of 0,10 to 5 mg/kg, inhibit totally (100 percent) the bronchospasm provoked by intravenous injection of histamine, serotonine and acetylcholine. Using the test of A.K. ARMITAGE (Brit. J. Pharmacol. 17, 196 (1961)), the new compounds, administered by the intraperitoneal route at doses of 1, 25 to 20 mg/kg protect 50 percent of the guinea-pig submitted to a 4 percent histamine aerosol.

The new compounds administered by intraperitoneal route, at doses of 5 to 20 mg/kg, protect 50 percent of mice against the anaphylactic shock provoked by the intravenous reinjection of 0,2 ml of a solution of 1,5 mg/ml of bovine albumin in pretreated animals by bovine albumin injection a fortnight before.

The gastric secretory activity of the new compounds was studied by the technic of H. SHAY (Gastroenterology 26, 906 (1954)). It was found that the compounds of the invention administered by intraperitoneal route in rat at doses of 5 to 30 mg/kg inhibit significantly the volume of secretions and their concentration in free acidity.

The here-above described pharmacological properties, as well as the low toxicity allow the use of the new compounds in therapy, especially in the treatment of bronchospasms, anaphylactic shock and gastric hypersecretion.

The invention also provides pharmaceutical compositions containing a compound of the general formula I or a physiologically tolerable salt thereof, in admixture or conjunction with a suitable pharmaceutical carrier, such for example, as distilled water, glucose, lactose, starch, talc, ethyl cellulose, magnesium stearate and cocoa butter. The pharmaceutical forms so obtained, may be : tablets, dragees, capsules, suppositories or solutions for oral, rectal or parenteral administration, at doses from 10 to 100 mg, one to five times a day.

What we claim is:

1. A compound selected from the group consisting of
A. benzamidoethyl piperazines of the general formula

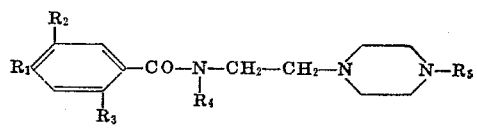

wherein $R_1$ is selected from the group consisting of hydrogen, lower alkoxy containing one to four carbon atoms inclusive, amino and alkanoylamino in which the alkanoyl group contains up to four carbon atoms inclusive;

$R_2$ is selected from the group consisting of hydrogen, halogen, lower alkyl containing one to four carbon atoms inclusive and amino;

$R_1$ and $R_2$ together represent methylenedioxy;

$R_3$ is selected from the group consisting of hydrogen, halogen, lower alkoxy containing one to four carbon atoms inclusive, hydroxy and amino;

$R_4$ is selected from the group consisting of hydrogen, lower alkyl containing one to four carbon atoms inclusive, and lower alkenyl containing two to four carbon atoms inclusive;

$R_5$ is selected from the group consisting of a. pyrimidyl and pyrazinyl;
b. 2-pyridyl and 4-pyridyl of the general formula

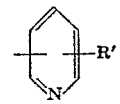

wherein R' is selected from the group consisting of hydrogen, lower alkyl and lower alkoxy each containing one to four carbon atoms inclusive, and 2-pyridyl N-oxide and 4-pyridyl N-oxide of the general formula

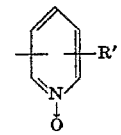

wherein R' has the meanings given above; and

B. physiologically tolerable addition salts with mineral or organic acids.

2. A compound of claim 1 which is 1-(3,4-methylenedioxy-benzamidoethyl)-4-(2-pyridyl)-piperazine.

3. A compound of claim 1 which is 1-(4-amino-benzamidoethyl)-4-(2-pyridyl)-piperazine.

4. A compound of claim 1 which is 1-(4-amino-benzamidoethyl)-4-(2-pyrimidyl)-piperazine.

5. A compound of claim 1 which is 1-(4-amino-benzamidoethyl)-4-(2-pyrazinyl)-piperazine.

6. A compound of claim 1 which is 1-(4-amino-benzamidoethyl)-4-(2-pyridyl N-oxide)-piperazine.

7. A compound of claim 1 which is 1-(2-methoxy-4-acetamido-5-chloro-benzamidoethyl)-4-(2-pyridyl)-piperazine.

* * * * *